United States Patent
Cronk

[11] Patent Number: 5,235,250
[45] Date of Patent: Aug. 10, 1993

[54] WINDSHIELD WIPER LIGHT CIRCUIT WITH OPTIONAL TIME DELAY

[76] Inventor: John E. Cronk, 2594 Spruce Creek Blvd., Daytona Beach, Fla. 32124

[21] Appl. No.: 783,768

[22] Filed: Oct. 28, 1991

[51] Int. Cl.⁵ ............................................. B60Q 1/02
[52] U.S. Cl. ...................................... 315/82; 315/83; 307/108
[58] Field of Search ......................... 315/82, 83, 77; 307/10.1, 10.8

[56] References Cited

U.S. PATENT DOCUMENTS

| | | | |
|---|---|---|---|
| 3,684,916 | 8/1972 | Skinner | 315/82 |
| 3,723,807 | 3/1973 | Tozzi | 315/83 |
| 3,824,405 | 7/1974 | Glaze | 307/10 LS |
| 4,301,390 | 11/1981 | Earle | 315/82 |
| 4,342,946 | 8/1982 | Valenzona et al. | 315/82 |
| 4,985,660 | 1/1991 | Cronk | 315/82 |

Primary Examiner—Eugene R. LaRoche
Assistant Examiner—Son Dinh
Attorney, Agent, or Firm—Edward M. Livingston

[57] ABSTRACT

Improved windshield wiper light circuitry for a device that automatically turns on vehicle head lights and other lights whenever the wipers are on is provided. A double-pole, single-throw relay switch (1) is positioned in vehicle circuitry between the ignition switch (13) and the light switch (14). One of the two poles has as electrical lead (3) to the low-beam head lights and the other (4) to the rear lights, park lights and side lights together. A diode rectifier (12) is provided in circuitry between a line (9) for continuous operation and a line (7) for intermittent operation of a wiper motor (11). A light shut-off delay provided by use of a timer (17) acts as a safety sentry light for a period after the ignition switch (13) is deactivated. A single pole relay switch (19) enables this circuitry to operation any 12-volt windshield wiper system.

7 Claims, 2 Drawing Sheets

WINDSHIELD WIPER LIGHT CIRCUIT WITH OPTIONAL TIME DELAY

BACKGROUND OF THE INVENTION

This invention relates to improved switching circuitry for turning on head lights automatically when turning on electrical windshield wipers.

The laws of most states require that vehicle lights be turned on whenever windshield wipers are used. Unfortunately, many drivers fail to turn on the lights during daytime in rainy weather, because it requires two switches be turned on. Moreover, after turning on the lights during daytime in rainy weather, the driver often forgets to turn the lights off resulting in a dead battery and a car which will not start. Thus, there exists a need for wiper circuitry for a device that will automatically turn on and turn off the lights of a vehicle with the windshield wipers.

The present invention incorporates improvements and modifications to circuitry patented by this invention in U.S. Pat. No. 4,985,660, issued Jan. 15, 1991. One modification enables the circuitry to operate on any twelve (12) volt windshield wiper system. Another modification incorporates a timer to keep the lights on for a preset time after the ignition is turned off thereby acting as a sentry light. The present invention also prevents any possible deactivation of the headlights when the wipers are deactivated.

There have been various other switching circuitry for turning on vehicle lights when turning on the windshield wipers. However, none have been sufficiently convenient, low-cost and reliable to become widely used. Included have been the following U.S. Pat. Nos.:

| | | |
|---|---|---|
| 4,097,839 | Lesiak | 1978 |
| 4,010,380 | Bailer | 1977 |
| 3,767,966 | Bell | 1973 |
| 3,909,619 | Knisley | 1975 |
| 3,591,845 | Vanderpoel | 1971 |
| 3,500,119 | Price | 1970 |
| 3,500,120 | Schultz | 1970 |
| 3,519,387 | Nolin | 1970 |

The Lesiak patent simplified earlier technology but not to the extent of Applicant's device. Different from the Lesiak patent, Applicant provides a separate switch which causes the windshield wiper switch to turn lights onto low beam and to turn on the tail lights and side lights simultaneously. Moreover, Applicant's circuitry causes said lights to come on even if the windshield wiper switch is placed in intermittent operation, whereas the prior art does not.

Different also from the Bailer patent as present wiper switches can be used when Applicant's switch circuitry is installed either as original equipment or as an after-sale add-on.

SUMMARY OF THE INVENTION

One object of this invention is to provide a switch that turns on head lights automatically when an electrical windshield wiper is turned on which can be used on any twelve (12) volt system.

Another object is to provide low-cost, wiper-switch-operated light switch that can be added as original equipment manufacture without changing existing windshield-wiper or light switch circuitry.

Another object is to provide low-cost, wiper-switch-operated light switch that can be installed as add-on equipment after original sale of the vehicle.

Still another object is to provide a wiper-switch-operated light switch that is sufficiently reliable to meet legal requirements of various states for turning on lights when windshield wipers are being operated.

An additional object is to provide further safety for departure of the occupants after an automobile is turned off.

A double-pole, single-throw relay switch is positioned in vehicle circuitry between the ignition switch and the light switch. One of the two poles has an electrical lead to the low-beam head lights and the other to the rear lights, park lights, and side lights together. A diode rectifier is provided in the circuitry between a line for continuous operation and a line intermittent operation of a wiper motor.

BRIEF DESCRIPTION OF THE DRAWINGS

The drawings used to illustrate the preferred embodiments of the invention are as follows.

DESCRIPTION OF THE PREFERRED EMBODIMENTS

Figure 1:
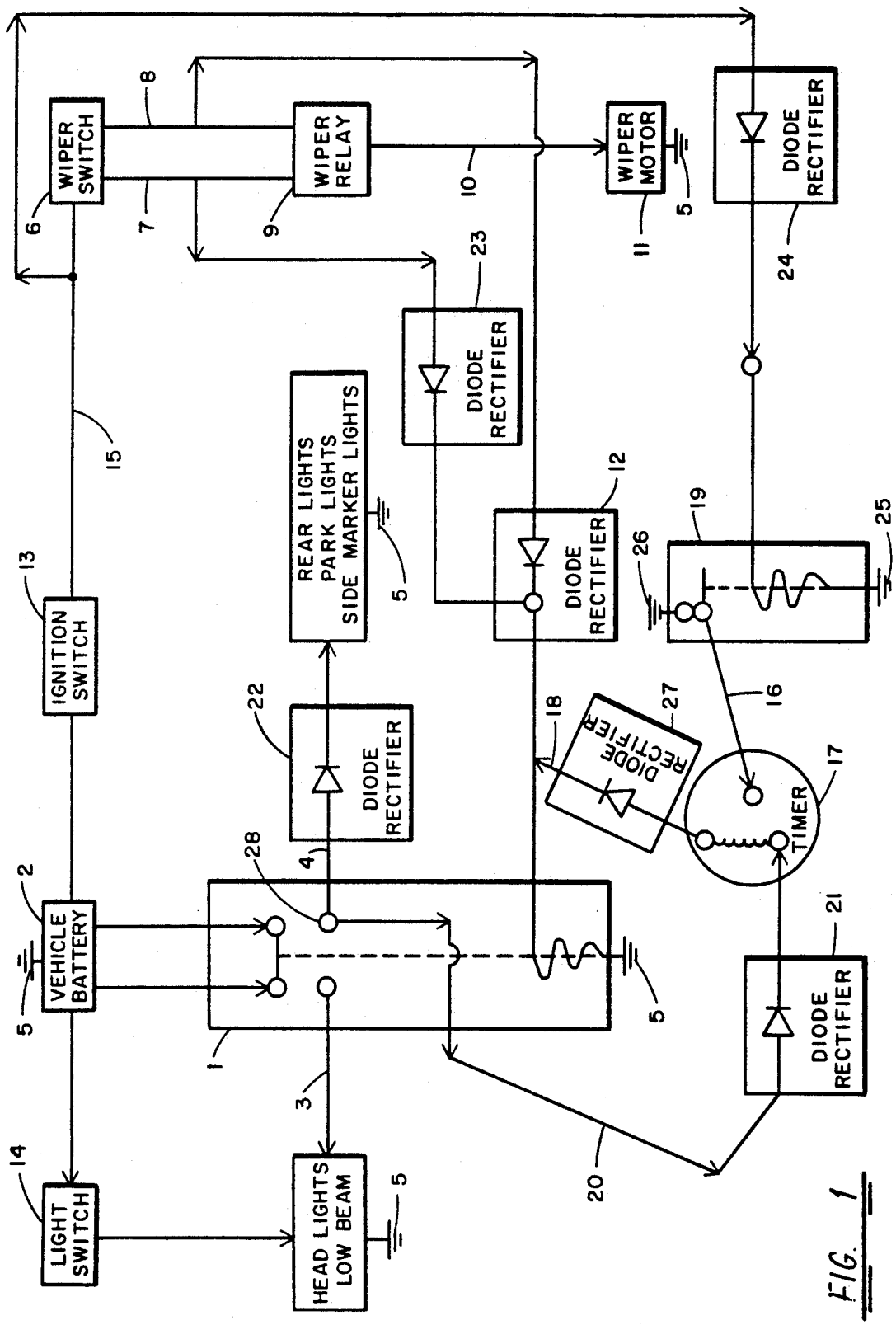
FIG. 1 is a black-box diagram of circuitry and components with a timer delay circuit.
Figure 2:
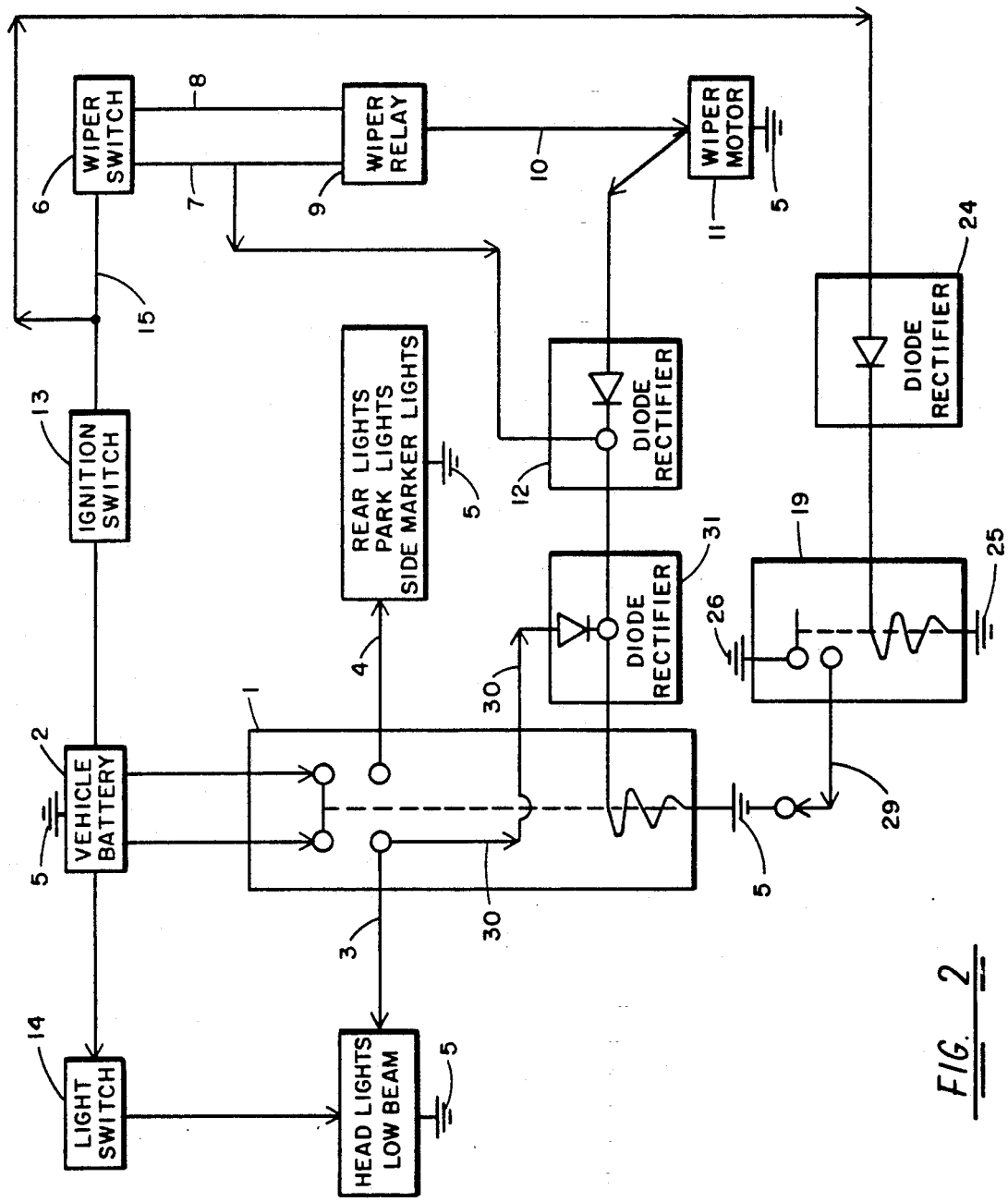
FIG. 2 is is a black-box diagram of circuitry and components without a timer delay circuit.

Referring to the FIGS. 1 and 2, a double-pole, single-throw automatic relay switch 1 is positioned in live electrical circuitry from a vehicle battery 2 and provided with a headlight lead 3 from one pole and a rear-light and other select light lead 4 from the other pole. A ground 5 is provided for each terminal.

A wiper switch 6 is provided with an intermittent-circuitry line 7 and a high-and-low-speed circuitry line 8 leading to a wiper relay 9 with a wiper-current line 10 to wiper motor 11.

A diode rectifier 12 is positioned in rectifier circuitry from the intermittent-circuitry line 7 and the high-and-low-speed circuitry line 8 to ground 5.

Leading from the ignition switch 13 to the wiper switch 6, back to the relay switch and to light switch 14 is relay circuit 9 which is activated with electrical current when the wiper switch 6 is turned on to intermittent or to either level of constant-speed operation. The diode rectifier 12 is a current gate which causes constant current to the head lights and other select lights when either intermittent or constant current are supplied to the wiper and to the relay switch 1.

The above description sets forth the basic circuitry of this inventor's earlier U.S. Pat. No. 4,985,660. Significant modifications have been added to enable the circuitry to operate universally on any twelve (12) volt windshield wiper system with a light time delay as well.

In FIG. 1, a modification enables the lights to continue to operate for a preset time period after the ignition switch 13 has been turned off. In operation, when the ignition switch 13 is turned it is in communication with a single pole, single throw relay 19 through a diode rectifier 24 which disconnects line 16 from a timer ground 26. Once the windshield wiper switch 6 is turned on, the relay 1 energizes terminal 28 and puts it in communication through line 20 and rectifier 21 with the timer 17, which locks relay 1. Relay 1 remains locked until the ignition switch 13 is turned off. Once the ignition switch 13 is turned off, the connecting line 16 activates timer 17 for a preset time, let's say 45 seconds. When the preset time set on timer 17 has expired, power to the rectifier 27 and line 18 is terminated, which deactivates the relay 1 turning the lights off.

FIG. 2 shows a modified circuitry similar to that of FIG. 1 except without the timer 17. Operationally, when the ignition switch 13 is turned on, line 15 is in communication through diode rectifier 24 with relay 19 activating line 29 to relay 1. When the windshield wiper switch 6 is turned to any cycle line 10 is energized through diode rectifier 12 to relay 1 closing contacts lines 3 and 4, thereby putting relay 1 in communication with line 30 and latching relay 1. Another optional diode rectifier 31 may be included in the line 30 between the low beam headlights, in order that there is sufficient voltage to activate the relay 1 for the windshield wipers and lights at the same time, which the latter may be necessary in some vehicles when many accessories in the vehicle are absorbing much voltage. When the ignition switch 13 is turned off, both relays 1 and 19 return to neutral, thereby turning off both lights and windshield wipers.

A side benefit of the embodiment of FIG. 2 occurs in the event of a dimmer switch failure The circuitry could serve to activate the low beam head lights when driving at night, since it would prevent the headlights from staying on in high beam when approaching oncoming traffic, which is illegal.

Thus, the present invention as described herein fulfills the objects set forth in the Summary of the Invention. Although only two embodiments have been described and illustrated, modifications thereto which accomplish the same results are intended to fall within the scope and spirit of the claims.

I claim:

1. An automatic windshield-wiper light circuit in a motor vehicle having headlights, tail lights, auxiliary lights and an electrical windshield wiper in electrically-operative circuitry with an electrical supply source comprising:
    an intermittent-current electrical line in electrical communication between a windshield-wiper switch and a windshield-wiper relay switch;
    a multiple-speed electrical line in electrical communication between the windshield-wiper switch and the windshield-wiper relay switch;
    rectifier circuitry in electrical communication with the intermittent-current electrical line;
    an automatic light relay switch in currentcommunicative relationship between the windshield-wiper switch and select lights of the vehicle;
    an automatic relay with rectifier circuitry connected between a ignition switch and the windshield wiper switch and the light relay switch; and
    an electrical circuit in communication between the lines to the windshield-wiper relay switch and the automatic light relay switch when the windshield-wiper switch is switched to electrical communication with the electrical supply source.

2. An automatic windshield-wiper light circuit according to claim 1 wherein the automatic light relay switch is a single-throw, double-pole switch having electrically contactable relationship to a separate light circuitry at each pole.

3. An automatic windshield-wiper light circuit according to claim 2 wherein the light circuitry contactable with one pole is for low-beam head lights and the light circuitry contactable with the other pole is for tail lights to the vehicle.

4. An automatic windshield-wiper circuit according to claim 1 wherein the automatic relay is a single-pole, single-throw switch.

5. The automatic windshield-wiper circuit of claim 1 further comprising a timer circuitry in line between the automatic relay and the automatic light relay switch.

6. A method for using an automatic windshield-wiper light consisting of:
    an intermittent-current electrical line in electrical communication between a windshield-wiper switch and a windshield wiper relay switch;
    a multiple-speed electrical line in electrical communication between the windshield-wiper switch and the windshield-wiper relay switch;
    rectifier circuitry in electrical communication with the intermittent-current electrical line; an automatic light relay switch in a current-communicative relationship between the windshield-wiper switch and select lights of the vehicle;
    an automatic relay with rectifier circuitry connected between a ignition switch and the windshield wiper switch and the light relay switch and
    an electrical circuit in communication between the lines to the windshield-wiper relay switch and the automatic light relay switch when the windshield-wiper switch is switched to electrical communication with the electrical supply source and comprising the following steps:
    (a) attaching the automatic light relay switch in live circuitry from a vehicle battery in convenient proximity to headlight and select other light lines;
    (b) attaching a rectifier diode circuit between an intermittent and constant-speed electrical-current line from the vehicle wiper switch to a ground;
    (c) attaching a relay circuit line from the wiper switch to a double-poles of a double-pole relay; and
    (d) attaching an automatic relay with rectifier circuitry between the ignition and wiper switches and the automatic light relay switch.

7. The method of claim 6 further comprising the step of attaching a timer with rectifier between the automatic relay and automatic light relay switch.

* * * * *